United States Patent
Wang et al.

(10) Patent No.: US 12,550,104 B2
(45) Date of Patent: Feb. 10, 2026

(54) POSITIONING MEASUREMENT METHOD AND APPARATUS, DEVICE AND READABLE STORAGE MEDIUM

(71) Applicant: VIVO MOBILE COMMUNICATION CO., LTD., Guangdong (CN)

(72) Inventors: Yuanyuan Wang, Guangdong (CN); Huaming Wu, Guangdong (CN); Ye Si, Guangdong (CN); Zixun Zhuang, Guangdong (CN)

(73) Assignee: VIVO MOBILE COMMUNICATION CO., LTD., Guangdong (CN)

(*) Notice: Subject to any disclaimer, the term of this patent is extended or adjusted under 35 U.S.C. 154(b) by 336 days.

(21) Appl. No.: 18/333,989

(22) Filed: Jun. 13, 2023

(65) Prior Publication Data

US 2023/0328684 A1    Oct. 12, 2023

Related U.S. Application Data

(63) Continuation of application No. PCT/CN2021/138766, filed on Dec. 16, 2021.

(30) Foreign Application Priority Data

Dec. 21, 2020 (CN) .................. 202011520590.2

(51) Int. Cl.
*H04W 64/00* (2009.01)
*H04L 5/00* (2006.01)
*H04W 24/08* (2009.01)

(52) U.S. Cl.
CPC ........... *H04W 64/00* (2013.01); *H04L 5/0005* (2013.01); *H04L 5/0053* (2013.01); *H04W 24/08* (2013.01)

(58) Field of Classification Search
None
See application file for complete search history.

(56) References Cited

U.S. PATENT DOCUMENTS

| | | | |
|---|---|---|---|
| 11,736,934 B2* | 8/2023 | Manolakos | H04W 72/0453 370/329 |
| 11,902,931 B2* | 2/2024 | Tao | H04W 24/10 |
| 2015/0323644 A9 | 11/2015 | Lee et al. | |

(Continued)

FOREIGN PATENT DOCUMENTS

| CN | 106538001 A | 3/2017 |
|---|---|---|
| CN | 108366379 A | 8/2018 |

(Continued)

OTHER PUBLICATIONS

Vivo, "Discussion on potential positioning enhancements", 3GPP TSG RAN WG1 #103-e, R1-2007666, e-Meeting, Oct. 26-Nov. 13, 2020.

(Continued)

*Primary Examiner* — Adolf Dsouza
(74) *Attorney, Agent, or Firm* — Foley & Lardner LLP

(57) ABSTRACT

Disclosed in the present application are a positioning measurement method and apparatus, a device and a readable storage medium. The method comprises: a terminal measures a plurality of positioning reference signals in a first positioning measurement window; and the terminal determines location information of the terminal according to the measurement result of the plurality of positioning reference signals.

19 Claims, 6 Drawing Sheets

401
A terminal performs measurement on a plurality of positioning reference signals within a first positioning measurement window 402
The terminal determines location information of the terminal based on measurement results of the plurality of positioning reference signals

(56) References Cited

U.S. PATENT DOCUMENTS

| | | | |
|---|---|---|---|
| 2016/0295374 A1 | 10/2016 | Persson et al. | |
| 2017/0311126 A1 | 10/2017 | Lu et al. | |
| 2020/0235877 A1 | 7/2020 | Manolakos et al. | |
| 2021/0029566 A1 | 1/2021 | Li et al. | |
| 2022/0057474 A1* | 2/2022 | Duan | G01S 5/0236 |
| 2023/0104211 A1* | 4/2023 | Manolakos | H04W 64/00 455/456.1 |
| 2023/0336976 A1* | 10/2023 | Manolakos | H04W 24/10 |

FOREIGN PATENT DOCUMENTS

| | | | | |
|---|---|---|---|---|
| CN | 110381528 A | 10/2019 | | |
| CN | 110602670 A | 12/2019 | | |
| CN | 111356075 A | 6/2020 | | |
| EP | 4239929 A1 * | 9/2023 | | H04W 64/00 |
| WO | WO-2020191646 A1 * | 10/2020 | | G01S 5/10 |

OTHER PUBLICATIONS

Vivo, "Remaining issue on prioritization of positioning assistance data", 3GPP TSG RAN WG1 #103-e, R1-2008678, e-Meeting, Oct. 26-Nov. 13, 2020.

Qualcomm Incorporated, "Summary of Email discussion [AT112-e][605][POS] LPP proposals", 3GPP TSG-RAN WG2 Meeting #112-e, R2-2011055, Electronic, Nov. 2-13, 2020.

Ericsson, "Email discussion summary for [96e][217] NR_pos_RRM_Part_3", 3GPP TSG-RAN WG4 Meeting # 96-e, R4-2012217, Electronic Meeting, Aug. 17-28, 2020.

Qualcomm Incorporated, "Comparison of 5GC-LMF and RAN-LMC based Positioning", 3GPP TSG-RAN WG3 Meeting #105bis, R3-195824, Revision of R3-193587, Chongqing, China, Oct. 14-18, 2019.

* cited by examiner 1 slot

Comb structure 2   Comb structure 4

501
The network-side device configures a first positioning measurement window, where the first positioning measurement window is used for performing measurement on a plurality of positioning reference signals by a terminal

POSITIONING MEASUREMENT METHOD AND APPARATUS, DEVICE AND READABLE STORAGE MEDIUM

CROSS-REFERENCE TO RELATED APPLICATIONS

This application is a continuation application of PCT International Application No. PCT/CN2021/138766 filed on Dec. 16, 2021, which claims priority to Chinese Patent Application No. 202011520590.2 filed in China on Dec. 21, 2020. The entire contents of each of the above-referenced applications are expressly incorporated herein by reference.

TECHNICAL FIELD

This application relates to the field of communications technologies, in particular to a positioning measurement method and apparatus, a device, and a readable storage medium.

BACKGROUND

For positioning in existing communication systems, terminals are allowed to perform measurement on positioning reference signal (PRS) only within a measurement gap, which is affected by a periodicity of the measurement gap and calibration time. In addition, a positioning delay, especially a physical layer delay, is far more than that required, and therefore positioning of low-latency terminals cannot be implemented.

SUMMARY

According to a first aspect, a positioning measurement method is provided, including:
  performing, by a terminal, measurement on a plurality of positioning reference signals within a first positioning measurement window; and
  determining, by the terminal, location information of the terminal based on measurement results of the plurality of positioning reference signals.

According to a second aspect, a positioning measurement method is provided, including:
  configuring, by a network-side device, a first positioning measurement window, where the first positioning measurement window is used for performing measurement on a plurality of positioning reference signals by a terminal.

According to a third aspect, a positioning measurement apparatus is provided, including:
  a measurement module, configured to perform measurement on a plurality of positioning reference signals within a first positioning measurement window; and
  a first determining module, configured to determine location information of a terminal based on measurement results of the plurality of positioning reference signals.

According to a fourth aspect, a positioning measurement apparatus is provided, including:
  a first configuration module, configured to configure a first positioning measurement window, where the first positioning measurement window is used for performing measurement on a plurality of positioning reference signals by a terminal.

According to a fifth aspect, a terminal is provided and includes a processor, a memory, and a program stored in the memory and capable of running on the processor. When the program is executed by the processor, the steps of the method according to the first aspect are implemented.

According to a sixth aspect, a network-side device is provided and includes a memory, a processor, and a program stored in the memory and capable of running on the processor. When the program is executed by the processor, the steps of the method according to the first aspect are implemented.

According to a seventh aspect, a readable storage medium is provided, where a program or instructions are stored in the readable storage medium, and when the program or the instructions are executed by a processor, the steps of the method according to the first aspect or the second aspect are implemented.

According to an eighth aspect, a computer program product is provided, where the computer program product is stored in a non-transitory readable storage medium, and the computer program product is executed by at least one processor to implement the method according to the first aspect or the second aspect.

According to a ninth aspect, a chip is provided, where the chip includes a processor and a communications interface, the communications interface is coupled to the processor, and the processor is configured to run a program or instructions to implement the method according to the first aspect or the second aspect.

BRIEF DESCRIPTION OF DRAWINGS

To describe the technical solutions in the embodiments of this application more clearly, the following briefly describes the accompanying drawings required for describing the embodiments of this application. Apparently, the accompanying drawings in the following description show merely some embodiments of this application, and a person of ordinary skill in the art may derive other drawings from these accompanying drawings without creative efforts.

DETAILED DESCRIPTION OF EMBODIMENTS

Figure 1:
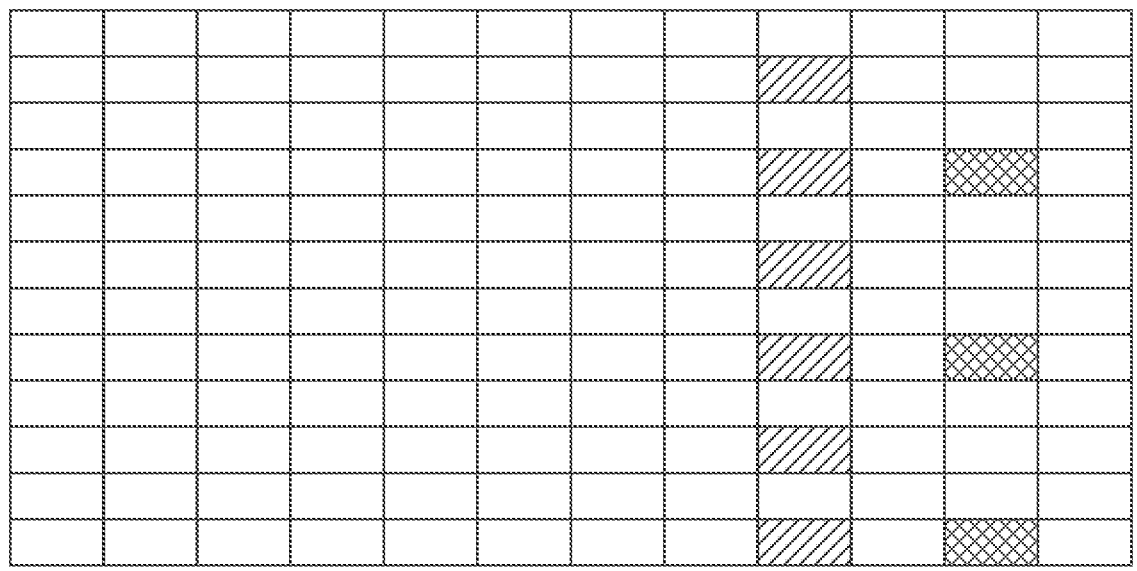
FIG. 1 is a schematic diagram of a comb structure 2 and a comb structure 4.
Figure 1:
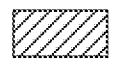
Figure 1:

The following clearly describes the technical solutions in the embodiments of this application with reference to the accompanying drawings in the embodiments of this application. Apparently, the described embodiments are only some rather than all of the embodiments of this application. All other embodiments obtained by a person of ordinary skill in the art based on the embodiments of this application without creative efforts shall fall within the protection scope of this application.

In the specification and claims of this application, the terms such as "first" and "second" are intended to distinguish between similar objects but do not necessarily indicate a specific order or sequence. It should be understood that the data used in this way is interchangeable in appropriate circumstances so that the embodiments of this application can be implemented in other orders than the order illustrated or described herein, and "first" and "second" are usually for distinguishing same-type objects but not limiting the number of objects, for example, a first object may be one or multiple. In addition, "and/or" in this specification and claims indicates at least one of connected objects, and the symbol "/" generally indicates that the associated objects are in an "or" relationship.

It should be noted that techniques described in the embodiments of this application are not limited to a long term evolution (LTE) or LTE-Advanced (LTE-A) system, and may also be applied to various wireless communications systems, for example, code division multiple access (CDMA), time division multiple access (TDMA), frequency division multiple access (FDMA), orthogonal frequency division multiple access (OFDMA), single-carrier frequency-division multiple access (SC-FDMA), and other systems. The terms "system" and "network" in the embodiments of this application are usually used interchangeably. Techniques described herein may be used in the aforementioned systems and radio technologies, and may also be used in other systems and radio technologies. However, in the following descriptions, a new radio (NR) system is described for an illustration purpose, and NR terms are used in most of the following descriptions, although these technologies may also be applied to other applications than an NR system application, for example, the sixth generation (6G) communications system.

The terminal in this specification may also be referred to as a terminal device or user equipment (UE), and the terminal may be a terminal-side device, such as a mobile phone, an integrated access and backhaul mobile termination (IABMT), a tablet computer, a laptop computer or a notebook computer, a personal digital assistant (PDA), a palmtop computer, a netbook, an ultra-mobile personal computer (UMPC), a mobile Internet device (MID), a wearable device or vehicle user equipment (VUE), or pedestrian user equipment (PUE). The wearable device includes: a wrist band, earphones, glasses, or the like. It should be noted that a specific type of the terminal is not limited in the embodiments of this application.

The network-side device in this specification may be a base station or a core network. The base station may be referred to as a NodeB, an evolved NodeB, an access point, a base transceiver station (BTS), a radio base station, a radio transceiver, a basic service set (BSS), an extended service set (ESS), a NodeB, an evolved NodeB (eNB), a home NodeB, a home evolved NodeB, a WLAN access point, a Wi-Fi node, a transmission and reception Point (TRP), or another appropriate term in the art. Provided that a same technical effect is achieved, the base station is not limited to a specific technical term. It should be noted that in the embodiments of this application, the base station in the NR system is merely used as an example, and a specific type of the base station is not limited.

For ease of understanding the embodiments of this application, the following technical points are first described.

(1) Measurement Gap

A terminal wanting to perform PRS measurement needs to perform measurement within a measurement gap; otherwise, the terminal does not expect to perform PRS measurement. The measurement gap may be interpreted as one periodic time interval. Within duration of the measurement gap, the terminal interrupts transmission of data/control signaling and can perform measurement only on a corresponding signal, such as a signal for positioning (for example, PRS) or a signal for radio resource management (RRM) (for example, synchronization signal (Synchronization Signal and PBCH block, SSB)).

For example, measurement gap configuration in the prior art is included in measurement gap configuration (MeasGapConfig) in radio resource control (RRC) signaling.

The measurement gap has a periodicity of {20, 40, 80, 160} milliseconds (ms) and a duration of {1.5, 3, 3.5, 4, 5.5, 6, 10, 20} ms. After the measurement gap is configured, data transmission is interrupted within the measurement gap.

Before receiving the measurement gap configuration, the terminal sends a measurement gap request to a serving new radio node (NR Node B, gNB) to assist the service gNB in configuring an appropriate measurement gap for positioning measurement. The request signaling contains information about a terminal-expected measurement gap, such as a periodicity, a period offset, a length, and measurement frequency.

(2) Positioning Reference Signal

The positioning reference signal includes PRS, tracking reference signal (TRS), or other evolved reference signals for positioning. The PRS is used as an example in this specification.

The PRS is a downlink positioning reference signal for positioning, and used for performing positioning measurement by a terminal. In order to complete positioning, the terminal needs to measure PRSs sent by a plurality of cells.

Optionally, the periodicity of PRS includes:

$$T_{per}^{PRS} \in 2^\mu \{4,8,16,32,64,5,10,20,40,80,160,320,640, 1280,2560,5210,10240,20480\}$$

Figure 2:
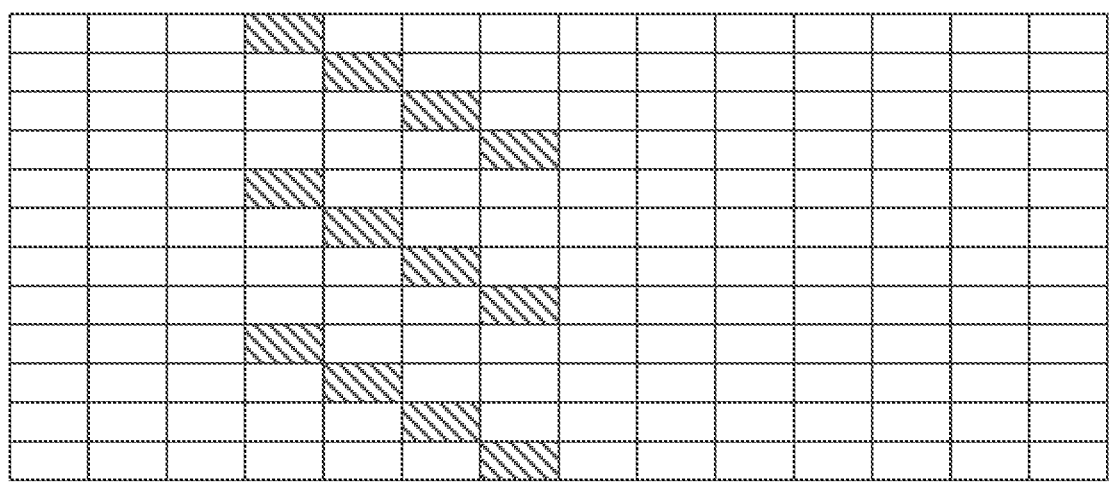
FIG. 2 is a schematic diagram of a comb structure 2.

A comb structure is the number of subcarriers spaced apart in frequency domain, for example, a comb 4 (comb4) structure and a comb 2 (comb2) structure illustrated in FIG. 1. In a full staggered pattern, all subcarriers are occupied, and therefore the number of symbols for PRS needs to be determined based on the number of combs to support a full staggered structure. For example, for a comb4 structure occupying 3 subcarriers on each symbol, 3 symbols need to be occupied to support full staggering. FIG. 2 is a comb4 full staggered pattern. Currently, the number of symbols supported by PRS is 2, 4, 6, and 12, the supported comb sizes are 2, 4, 6, and 12, and only the full staggered pattern is supported.

According to the related art, it can be found that the maximum periodicity of measurement gap is 160 ms, and the terminal may need to wait for 160 ms before performing PRS measurement, which greatly limits positioning delay. In addition, configuration of the measurement gap also limits flexible configuration of PRS (the period of PRS is much more flexible than the measurement gap).

Figure 3:
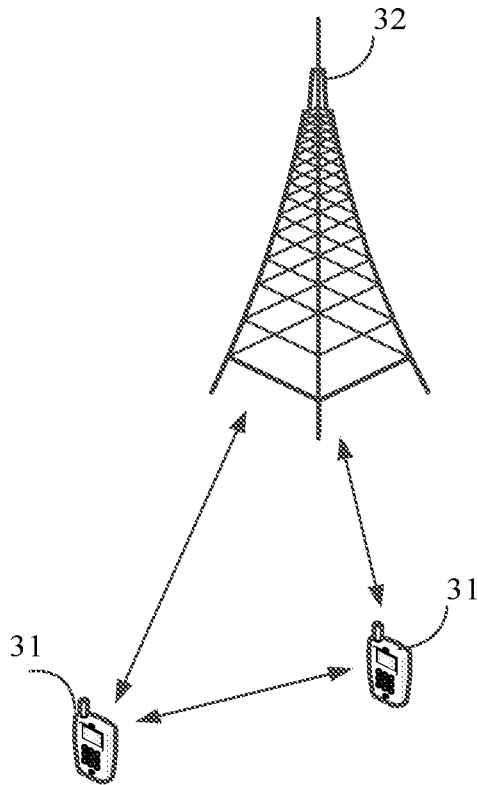
FIG. 3 is a block diagram of a wireless communications system to which the embodiments of this application are applicable.

FIG. 3 is a block diagram of a wireless communications system to which the embodiments of this application are applicable. The wireless communications system includes a terminal 31 and a network-side device 32. The terminal 31 may also be referred to as a terminal device or user equipment (UE), and the terminal 31 may be a terminal-side device, such as a mobile phone, a tablet computer (Tablet Personal Computer), a laptop computer or a notebook computer, a personal digital assistant (PDA), a palmtop computer, a netbook, an ultra-mobile personal computer (UMPC), a mobile Internet device (MID), a wearable device or vehicle user equipment (VUE), or pedestrian user equipment (PUE). The wearable device includes: a wrist band, earphones, glasses, or the like. It should be noted that a specific type of the terminal 31 is not limited in the embodiments of this application. The network-side device 32 may be a base station or a core network side device. The base station may be referred to as a NodeB, an evolved NodeB, an access point, a base transceiver station (BTS), a radio base station, a radio transceiver, a basic service set (BSS), an extended service set (ESS), a NodeB, an evolved NodeB (eNB), a home NodeB, a home evolved NodeB, a WLAN access point, a Wi-Fi node, a transmission and reception Point (TRP), or another appropriate term in the art. Provided that a same technical effect is achieved, the base station is not limited to a specific technical term. It should be noted that in the embodiments of this application, the base station in the NR system is merely used as an example, and a specific type of the base station is not limited.

The following describes in detail a positioning measurement method and apparatus, a device, and a readable storage medium provided in the embodiments of this application by using specific embodiments and application scenarios thereof with reference to the accompanying drawings.

Figure 4:
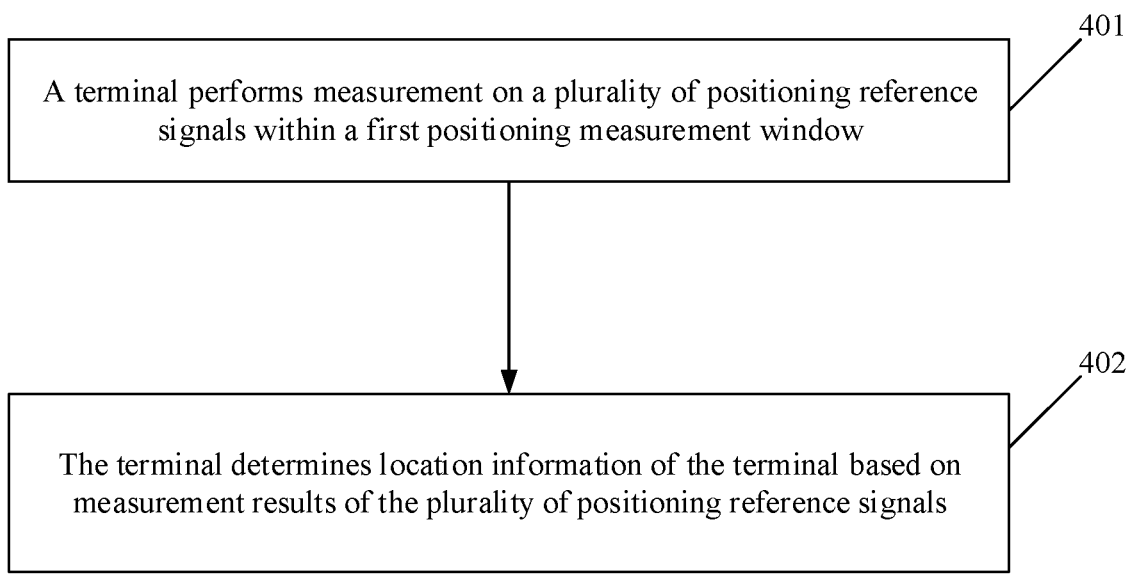
FIG. 4 is a first flowchart of a positioning measurement method according to an embodiment of this application.

Referring to FIG. 4, an embodiment of this application provides a positioning measurement method, executed by a terminal. The method includes step 401 and step 402.

Step 401: The terminal performs measurement on a plurality of positioning reference signals within a first positioning measurement window.

Step 402: The terminal determines location information of the terminal based on measurement results of the plurality of positioning reference signals.

Optionally, the location information of the terminal includes one or more of the following: (1) a signal measurement result; (2) an absolute location of the terminal; and (3) a relative location of the terminal.

In this embodiment of this application, the first positioning measurement window is determined based on one or more of the following:
(1) positioning reference signal configuration information of one or more TRPs; that is, configuration information of a positioning reference signal of each of the one or more TRPs;
(2) a plurality of first positioning search windows;
(3) configuration information of the first positioning measurement window;
(4) first request information, where the first request information is used to request for the first positioning measurement window; and
(5) a first measurement gap, where the first measurement gap is used for positioning reference signal measurement.

It should be noted that the first positioning measurement window may be configured by the network side, that is, being determined based on (3) the configuration information of the first positioning measurement window; or the first positioning measurement window may be determined by the terminal based on a positioning reference signal to be measured, for example, based on (1) or (2); or the first positioning measurement window may be determined by the terminal based on configuration information of the network side, for example, (1) and (3). In another embodiment, the (3) configuration information of the first positioning measurement window may alternatively be determined after (4) the first request information. In yet another embodiment, the first positioning measurement window is subject to the first measurement gap.

If the terminal performs positioning reference measurement directly within the measurement gap, the terminal needs to interrupt transmission of data/control signaling to measure only the positioning reference signal, which results in a large transmission delay. However, in this embodiment of this application, the terminal performs measurement on the plurality of reference signals in the first positioning measurement window, with no need to interrupt transmission of data/control signaling during measurement, thereby satisfying positioning requirements of low-latency terminals.

In this embodiment of this application, the positioning reference signal configuration information includes one or more of the following:
(1) identification information of the positioning reference signal;
for example, downlink positioning reference signal identifier (dl-prs-id) (or cell/TRP identifier), positioning reference signal resource set identifier (PRS resource set ID), and positioning reference signal resource identifier (PRS resource ID);
(2) the number of symbols;
(3) a comb size;
(4) time domain information of the positioning reference signal; for example, periodicity, slot offset, start symbol, or symbol offset); and
(5) frequency domain information of the positioning reference signal;
for example, frequency layer information, bandwidth, point A (PointA), frequency-domain position of common resource block 0 (CRB0), frequency domain offset such as start position (start physical resource block (Start PRB)) or offset to carrier (relative to the position of CRB0), or bandwidth part.

In this embodiment of this application, the plurality of first positioning search windows have at least one of the following characteristics:
(1) Each of the plurality of TRPs is configured with a same or different first positioning search windows.

That is, the first positioning search window is configured per TRP. The first positioning search window includes at least one of the following:
expected reference signal time difference (ExpectedRSTD) (for example, a subframe time difference for expected reception of downlink positioning reference signal (dl PRS), or may be a time difference between expected reception of two TRPs); and
expected reference signal time difference uncertainty (ExpectedRSTD-Uncertainty) (for example, a search window or uncertainty of the ExpectedRSTD).
(2) The number of first positioning search windows of the plurality of TRPs is the number of TRP groups (for example, being configured per TRP group).
(3) The plurality of first positioning search windows include one or more maximum search ranges, where the maximum search range limits a range of the first positioning search window.

In this embodiment of this application, the configuration information of the first positioning measurement window includes one or more of the following:

(1) identification information of the first positioning measurement window;
(2) time domain information of the first positioning measurement window;
(3) frequency domain information of the first positioning measurement window;
(4) a priority of the first positioning measurement window;
(5) positioning reference signal configuration information of one or more TRPs relative to the first positioning measurement window; and
(6) first positioning search window information of a plurality of TRPs relative to the first positioning measurement window.

In this embodiment of this application, the method further includes: receiving configuration information of the first positioning measurement window.

In this embodiment of this application, the time domain information of the first positioning measurement window includes one or more of the following:
(1) a start time of the first positioning measurement window;
(2) a window length of the first positioning measurement window;
(3) a time domain type of the first positioning measurement window;
(4) a repetition parameter of the first positioning measurement window; and
1(5) a time interval between repeated first positioning measurement windows.

In this embodiment of this application, the time domain type includes one or more of the following:
(1) periodic;
(2) semi-persistent; and
(3) aperiodic.

In this embodiment of this application, the frequency domain information of the first positioning measurement window includes one or more of the following:
(1) a frequency domain starting point of the first positioning measurement window;
for example, absolute frequency domain information (including one of the following: PointA and CRB0), a starting point of a bandwidth part (BWP), and a starting point of a carrier;
(2) bandwidth information of the first positioning measurement window;
(3) a frequency domain granularity of the first positioning measurement window;
(4) a subcarrier spacing of the first positioning measurement window; and
(5) a frequency domain offset of the first positioning measurement window;
for example, that of a start physical resource block (start PRB) relative to a reference point A.

In this embodiment of this application, the first request information includes one or more of the following:
(1) identification information of the first positioning measurement window;
(2) configuration information of the first positioning measurement window;
(3) measurement configuration information of one or more positioning reference signals;
for example, frequency domain information of the positioning reference signal and/or time domain information of the positioning reference signal; and
(4) a priority of the first positioning measurement window;

In this embodiment of this application, the method further includes: sending the first request information in a first transmission manner.

The first transmission manner includes one or more of the following:
(1) uplink control information (UCI);
(2) radio resource control (RRC) signaling;
(3) media access control control element (MAC CE);
(4) long term evolution positioning protocol LPP); and
(5) new radio positioning protocol A (NR Positioning Protocol A, NRPPa).

In this embodiment of this application, information about the first measurement gap includes one or more of the following:
(1) configuration information of the first measurement gap; and
(2) a priority of the first measurement gap.

In this embodiment of this application, the performing, by a terminal, measurement on a plurality of positioning reference signals within a first positioning measurement window includes:
in response to a first event, performing, by the terminal, measurement on the plurality of positioning reference signals within the first positioning measurement window.

In this embodiment of this application, the method further includes:
in response to a second event, receiving, by the terminal, configuration information of the first positioning measurement window.

In this embodiment of this application, the first event or the second event includes one or more of the following:
(1) a positioning response latency is less than a first threshold;
(2) a positioning service latency indicator is less than a second threshold; and
(3) the positioning service is a specific positioning service;
for example, ultra reliable low latency communication (URLLC) service, and first-type service (low latency service);
(4) the first measurement gap is unable to satisfy a requirement;
(5) request for the first measurement gap fails;
(6) one or more positioning reference signals are sent in an active bandwidth part (BWP);
(7) one or more positioning reference signals are sent in a specific frequency domain range; and
(8) configuration of the first measurement gap fails.

In this embodiment of the application,
the first positioning measurement window and the first measurement gap are not simultaneously configured for the terminal; or the terminal does not expect simultaneous configuration of the first positioning measurement window and the first measurement gap.

In this embodiment of this application, the method further includes:
if the first positioning measurement window has been configured for the terminal, the terminal does not request for the first measurement gap or the first measurement gap is not configured.

In this embodiment of this application, the method further includes:
if the first positioning measurement window has been configured for the terminal, the terminal needs to perform radio resource management (RRM) measurement, and the RRM measurement needs to be performed in a measurement gap, requesting, by the terminal, for configuration of a second measurement gap.

It should be noted that, in an embodiment, the second measurement gap includes a first measurement gap; and in another embodiment, the second measurement gap is a special case of the first measurement gap. For example, the second measurement gap is used only for RRM measurement.

In this embodiment of this application, if the second measurement gap and the first positioning measurement window have been configured for the terminal, the method further includes:
the first positioning measurement window is disabled after configuration of the second measurement gap;
or
based on priorities of the second measurement gap and the first positioning measurement window, determining that the second measurement gap or the first positioning measurement window is disabled;
or
the terminal does not expect to perform PRS measurement during configuration of the second measurement gap;
or
within the second measurement gap, the terminal does not expect to perform PRS measurement, or the first positioning measurement window is disabled;
or
performing, by the terminal, PRS measurement beyond the second measurement gap and within the first positioning measurement window;
or
performing, by the terminal, RRM measurement within the second measurement gap;
or
performing, by the terminal, PRS measurement and RRM measurement within the second measurement gap.

In this embodiment of this application, the method further includes:
reporting a terminal capability to a network-side device.
The terminal capability includes one or more of the following:
(1) whether the first positioning measurement window is supported;
(2) whether the first positioning measurement window and the first measurement gap are supported simultaneously;
(3) whether PRS measurement within the first positioning measurement window is supported;
(4) a window length of the first positioning measurement window;
(5) a periodicity of the first positioning measurement window;
(6) the maximum number of TRPs supported within the first positioning measurement window;
(7) the maximum number of resources supported within the first positioning measurement window;
(8) the maximum number of resource sets supported within the first positioning measurement window;
(9) a measurement capability within the first positioning measurement window;
(10) an interval for switching between PRS beams within the first positioning measurement window; and
(11) maximum measurement duration supported within the first positioning measurement window.

In this embodiment of this application, the terminal can perform measurement on the plurality of positioning reference signals within the first positioning measurement window, and determine the location information of the terminal based on the measurement results. Positioning requirements of low-latency terminals are satisfied because transmission of data/control signaling does not need to be interrupted during measurement.

Figures 5, 6:
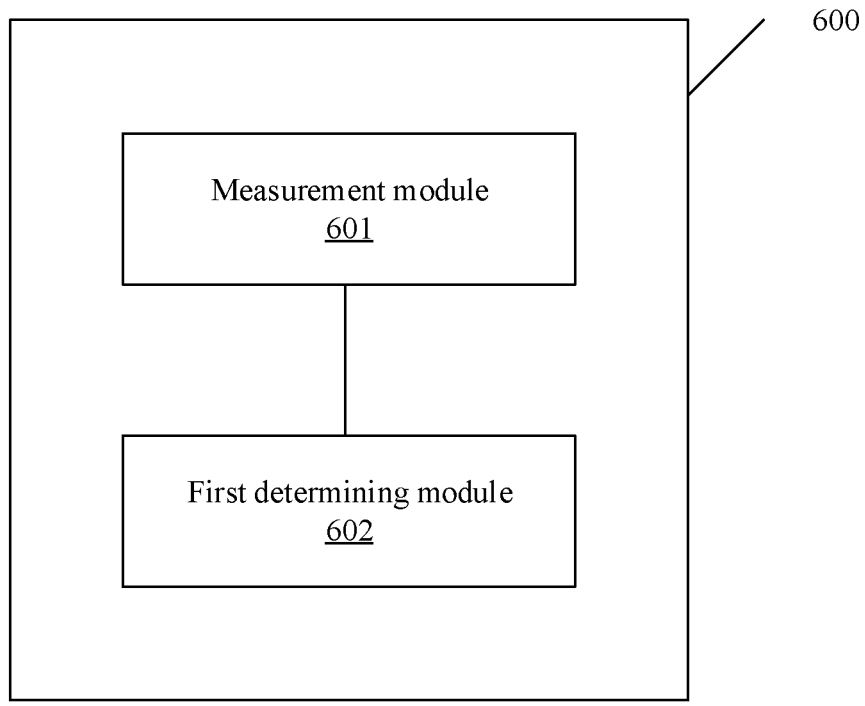
FIG. 5 is a second flowchart of a positioning measurement method according to an embodiment of this application.
FIG. 6 is a first schematic diagram of a positioning measurement apparatus according to an embodiment of this application.

Referring to FIG. 5, an embodiment of this application provides a positioning measurement method, executed by a network-side device. The network-side device may be a base station, a TRP, or a core-network device. The specific steps include step 501.

Step 501: The network-side device configures a first positioning measurement window, where the first positioning measurement window is used for performing measurement on a plurality of positioning reference signals by a terminal.

In this embodiment of the application, optionally, the method further includes: receiving, by the network-side device, a measurement result; and determining, by the network-side device, location information of the terminal based on the measurement result.

In this embodiment of this application, the first positioning measurement window is determined based on one or more of the following:
(1) positioning reference signal configuration information of one or more TRPs;
(2) a plurality of first positioning search windows;
(3) configuration information of the first positioning measurement window;
(4) first request information, where the first request information is used to request for the first positioning measurement window; and
(5) a first measurement gap, where the first measurement gap is used for positioning reference signal measurement.

In this embodiment of this application, the positioning reference signal configuration information includes one or more of the following:
(1) identification information of the positioning reference signal;
(2) the number of symbols;
(3) a comb size;
(4) time domain information of the positioning reference signal;
for example, periodicity, slot offset, or start symbol offset; and
(5) frequency domain information of the positioning reference signal;
for example, frequency layer information, bandwidth, PointA, frequency-domain position of CRB0, frequency domain offset such as start position (Start PRB) or offset to carrier (relative to the position of CRB0), or bandwidth part.

In this embodiment of this application, the plurality of first positioning search windows have at least one of the following characteristics:
(1) each of the plurality of TRPs is configured with a same or different first positioning search windows;
(2) the number of first positioning search windows of the plurality of TRPs is the number of TRP groups; and
(3) the plurality of first positioning search windows include one or more maximum search ranges, where the maximum search range limits a range of the first positioning search window.

In this embodiment of the application,
the configuration information of the first positioning measurement window includes one or more of the following:

(1) identification information of the first positioning measurement window;
(2) time domain information of the first positioning measurement window;
(3) frequency domain information of the first positioning measurement window;
(4) a priority of the first positioning measurement window;
(5) positioning reference signal configuration information of a plurality of TRPs relative to the first positioning measurement window; and
(6) first positioning search window information of a plurality of TRPs relative to the first positioning measurement window.

In this embodiment of this application, the time domain information of the first positioning measurement window includes one or more of the following:
(1) a start time of the first positioning measurement window;
(2) a window length of the first positioning measurement window;
(3) a time domain type of the first positioning measurement window;
(4) a repetition parameter of the first positioning measurement window; and
(5) a time interval between repeated first positioning measurement windows.

In this embodiment of this application, the time domain type includes one or more of the following:
(1) periodic;
(2) semi-persistent; and
(3) aperiodic.

In this embodiment of this application, the frequency domain information of the first positioning measurement window includes one or more of the following:
(1) a frequency domain starting point of the first positioning measurement window;
(2) bandwidth information of the first positioning measurement window;
(3) a frequency domain granularity of the first positioning measurement window;
(4) a subcarrier spacing of the first positioning measurement window; and
(5) a frequency domain offset of the first positioning measurement window.

In this embodiment of this application, the first request information includes one or more of the following:
(1) identification information of the first positioning measurement window;
(2) configuration information of the first positioning measurement window;
(3) measurement configuration information of one or more positioning reference signals;
for example, frequency domain information of the positioning reference signal and/or time domain information of the positioning reference signal; and
(4) a priority of the first positioning measurement window;

In this embodiment of this application, the method further includes: receiving the first request information in a first transmission manner, where the first transmission manner includes one or more of the following:
(1) uplink control information;
(2) radio resource control signaling;
(3) media access control control element;
(4) long-term evolution positioning protocol; and
(5) new radio positioning protocol A.

In this embodiment of this application, information about the first measurement gap includes one or more of the following:
(1) configuration information of the first measurement gap; and
(2) a priority of the first measurement gap.

In this embodiment of this application, the method further includes: receiving, by the network-side device, a terminal capability.

The terminal capability includes one or more of the following:
(1) whether the first positioning measurement window is supported;
(2) whether the first positioning measurement window and the first measurement gap are supported simultaneously;
(3) whether PRS measurement within the first positioning measurement window is supported;
(4) a window length of the first positioning measurement window;
(5) a periodicity of the first positioning measurement window;
(6) the maximum number of TRPs supported within the first positioning measurement window;
(7) the maximum number of resources supported within the first positioning measurement window;
(8) the maximum number of resource sets supported within the first positioning measurement window;
(9) a measurement capability within the first positioning measurement window;
(10) an interval for switching between PRS beams within the first positioning measurement window; and
(11) maximum measurement duration supported within the first positioning measurement window.

In this embodiment of this application, the method further includes:
determining, by the network-side device, first PRS configuration information and/or second PRS configuration information based on the first positioning measurement window.

In this embodiment of this application, the first PRS configuration information is configuration information of periodic PRS.

In this embodiment of this application, the second PRS configuration information includes one or more of the following:
(1) configuration information of periodic PRS;
(2) configuration information of a PRS relative to the first positioning measurement window;
(3) configuration information of semi-persistent PRS; and
(4) configuration information of aperiodic PRS.

In this embodiment of this application, the first positioning reference signal configuration information, the second positioning reference signal configuration information, and/or the configuration information of the first positioning measurement window includes one or more of the following:
(1) frame offset information; and
(2) absolute time information.

In this embodiment of this application, a sequence generation rule for the positioning reference signal includes one or more of the following:
(1) a time-domain position relative to each cell;
(2) a time-domain position relative to the first positioning measurement window; and
(3) a time-domain position relative to a serving cell or a reference cell.

In this embodiment of this application, the network-side device configures, for the terminal, the first positioning measurement window that is used for performing measurement on the plurality of positioning reference signals by the terminal, so that the terminal can perform measurement on the plurality of positioning reference signals within the first positioning measurement window and determine the location information of the terminal based on the measurement results, so as to satisfy positioning requirements of low-latency terminals.

Referring to FIG. 6, an embodiment of this application provides a positioning measurement apparatus, where the apparatus 600 includes:

a measurement module 601, configured to perform measurement on a plurality of positioning reference signals within a first positioning measurement window; and a first determining module 602, configured to determine location information of a terminal based on measurement results of the plurality of positioning reference signals.

In this embodiment of this application, the first positioning measurement window is determined based on one or more of the following:

positioning reference signal configuration information of one or more transmission and reception points TRPs;

a plurality of first positioning search windows;

configuration information of the first positioning measurement window;

first request information, where the first request information is used to request for the first positioning measurement window; and a first measurement gap, where the first measurement gap is used for positioning reference signal measurement.

In this embodiment of this application, the positioning reference signal configuration information includes one or more of the following:

identification information of the positioning reference signal;

the number of symbols;

a comb size;

time domain information of the positioning reference signal; and frequency domain information of the positioning reference signal.

In this embodiment of this application, the plurality of first positioning search windows have at least one of the following characteristics:

each of the plurality of TRPs is configured with a same or different first positioning search windows;

the number of first positioning search windows of the plurality of TRPs is the number of TRP groups; and the plurality of first positioning search windows include one or more maximum search ranges, where the maximum search range limits a range of the first positioning search window.

In this embodiment of this application, the configuration information of the first positioning measurement window includes one or more of the following:

identification information of the first positioning measurement window;

time domain information of the first positioning measurement window;

frequency domain information of the first positioning measurement window;

a priority of the first positioning measurement window;

positioning reference signal configuration information of one or more TRPs relative to the first positioning measurement window; and first positioning search window information of a plurality of TRPs relative to the first positioning measurement window.

In this embodiment of this application, the time domain information of the first positioning measurement window includes one or more of the following:

a start time of the first positioning measurement window;

a window length of the first positioning measurement window;

a time domain type of the first positioning measurement window;

a repetition parameter of the first positioning measurement window; and a time interval between repeated first positioning measurement windows.

In this embodiment of this application, the time domain type includes one or more of the following:

periodic;

semi-persistent; and aperiodic.

In this embodiment of this application, the frequency domain information of the first positioning measurement window includes one or more of the following:

a frequency domain starting point of the first positioning measurement window;

bandwidth information of the first positioning measurement window;

a frequency domain granularity of the first positioning measurement window;

a subcarrier spacing of the first positioning measurement window; and a frequency domain offset of the first positioning measurement window.

In this embodiment of this application, the first request information includes one or more of the following:

identification information of the first positioning measurement window;

configuration information of the first positioning measurement window;

measurement configuration information of one or more positioning reference signals; and a priority of the first positioning measurement window.

In this embodiment of this application, the first request information is transmitted in one or more of the following manners:

uplink control information;

radio resource control signaling;

media access control control element;

long-term evolution positioning protocol; and new radio positioning protocol A.

In this embodiment of this application, information about the first measurement gap includes one or more of the following:

configuration information of the first measurement gap; and a priority of the first measurement gap.

In this embodiment of this application, the measurement module is further configured to: perform, for the terminal, measurement on the plurality of positioning reference signals within the first positioning measurement window in response to the first event.

In this embodiment of this application, the apparatus further includes:
  a first receiving module, configured to, in response to a second event, receive configuration information of the first positioning measurement window.

In this embodiment of this application, the first event or the second event includes one or more of the following:
  a positioning response latency is less than a first threshold;
  a positioning service latency indicator is less than a second threshold;
  the positioning service is a specific positioning service;
  the first measurement gap is unable to satisfy a requirement;
  request for the first measurement gap fails;
  one or more positioning reference signals are sent in an active BWP;
  one or more positioning reference signals are sent in a specific frequency domain range; and
  configuration of the first measurement gap fails.

In this embodiment of this application, the apparatus further includes:
  a first processing module, configured to expect no simultaneous configuration of the first positioning measurement window and the first measurement gap.

In this embodiment of this application, the apparatus further includes:
  a second processing module, configured to: if the first positioning measurement window has been configured for the terminal, skip requesting for the first measurement gap or expect no configuration of the first measurement gap.

In this embodiment of this application, the apparatus further includes:
  a third processing module, configured to request for configuration of a second measurement gap if the first positioning measurement window has been configured for the terminal, the terminal needs to perform RRM measurement, and the RRM measurement needs to be performed in a measurement gap.

In this embodiment of this application, the apparatus further includes:
  a fourth processing module, configured to: if the second measurement gap and the first positioning measurement window have been configured for the terminal, perform any one of the following:
  the first positioning measurement window is disabled after configuration of the second measurement gap;
  based on priorities of the second measurement gap and the first positioning measurement window, determining that the second measurement gap or the first positioning measurement window is disabled;
  execution of PRS measurement is not expected during configuration of the second measurement gap;
  within the second measurement gap, execution of PRS measurement is not expected, or the first positioning measurement window is disabled;
  performing PRS measurement beyond the second measurement gap and within the first positioning measurement window;
  performing RRM measurement within the second measurement gap; and
  performing PRS measurement and RRM measurement within the second measurement gap.

In this embodiment of this application, the apparatus further includes:
  a reporting module, configured to report a terminal capability to a network-side device.

The terminal capability includes one or more of the following:
  whether the first positioning measurement window is supported;
  whether the first positioning measurement window and the first measurement gap are supported simultaneously;
  whether PRS measurement within the first positioning measurement window is supported;
  a window length of the first positioning measurement window;
  a periodicity of the first positioning measurement window;
  the maximum number of TRPs supported within the first positioning measurement window;
  the maximum number of resources supported within the first positioning measurement window;
  the maximum number of resource sets supported within the first positioning measurement window;
  a measurement capability within the first positioning measurement window;
  an interval for switching between PRS beams within the first positioning measurement window; and
  maximum measurement duration supported within the first positioning measurement window.

The apparatus provided in this embodiment of this application is capable of implementing the processes implemented in the method embodiment shown in FIG. 3, with the same technical effects achieved. To avoid repetition, details are not described herein again.

Figure 7:
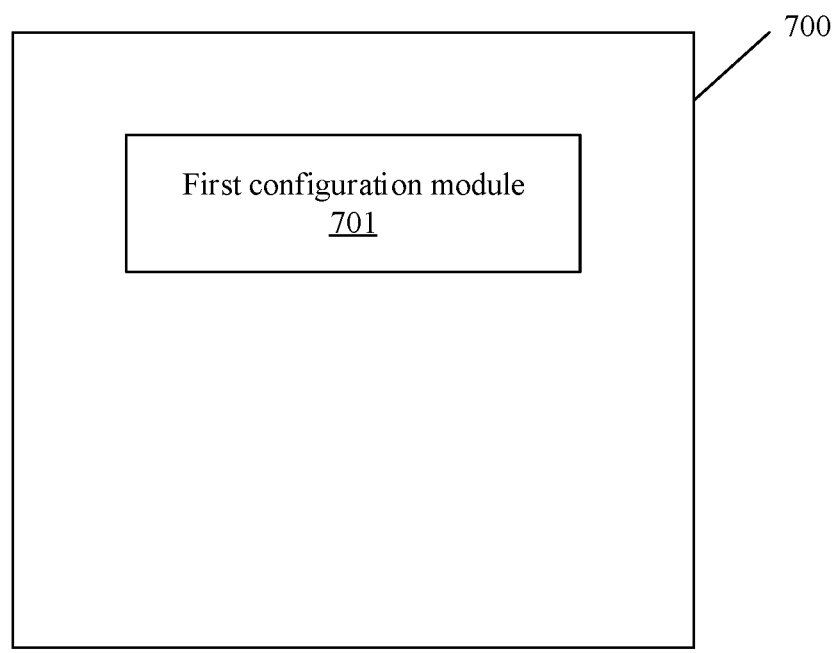
FIG. 7 is a second schematic diagram of a positioning measurement apparatus according to an embodiment of this application.

Referring to FIG. 7, an embodiment of this application provides a positioning measurement apparatus, where the apparatus 700 includes:
  a first configuration module 701, configured to configure a first positioning measurement window, where the first positioning measurement window is used for performing measurement on a plurality of positioning reference signals by a terminal.

In this embodiment of this application, the apparatus further includes: a second receiving module configured to receive a measurement result; and
  a second determining module configured to determine location information of the terminal based on the measurement result.

In this embodiment of this application, the first positioning measurement window is determined based on one or more of the following:
  positioning reference signal configuration information of one or more TRPs;
  a plurality of first positioning search windows;
  configuration information of the first positioning measurement window;
  first request information, where the first request information is used to request for the first positioning measurement window; and
  a first measurement gap, where the first measurement gap is used for positioning reference signal measurement.

In this embodiment of this application, the positioning reference signal configuration information includes one or more of the following:

identification information of the positioning reference signal;
the number of symbols;
a comb size;
time domain information of the positioning reference signal; and
frequency domain information of the positioning reference signal.

In this embodiment of this application, the plurality of first positioning search windows have at least one of the following characteristics:
each of the plurality of TRPs is configured with a same or different first positioning search windows;
the number of first positioning search windows of the plurality of TRPs is the number of TRP groups; and
the plurality of first positioning search windows include one or more maximum search ranges, where the maximum search range limits a range of the first positioning search window.

In this embodiment of this application, the configuration information of the first positioning measurement window includes one or more of the following:
identification information of the first positioning measurement window;
time domain information of the first positioning measurement window;
frequency domain information of the first positioning measurement window;
a priority of the first positioning measurement window;
positioning reference signal configuration information of a plurality of TRPs relative to the first positioning measurement window; and
first positioning search window information of a plurality of TRPs relative to the first positioning measurement window.

In this embodiment of this application, the time domain information of the first positioning measurement window includes one or more of the following:
a start time of the first positioning measurement window;
a window length of the first positioning measurement window;
a time domain type of the first positioning measurement window;
a repetition parameter of the first positioning measurement window; and
a time interval between repeated first positioning measurement windows.

In this embodiment of this application, the time domain type includes one or more of the following:
periodic;
semi-persistent; and
aperiodic.

In this embodiment of this application, the frequency domain information of the first positioning measurement window includes one or more of the following:
a frequency domain starting point of the first positioning measurement window;
bandwidth information of the first positioning measurement window;
a frequency domain granularity of the first positioning measurement window;
a subcarrier spacing of the first positioning measurement window; and
a frequency domain offset of the first positioning measurement window.

In this embodiment of this application, the first request information includes one or more of the following:
identification information of the first positioning measurement window;
configuration information of the first positioning measurement window;
measurement configuration information of one or more positioning reference signals; and
a priority of the first positioning measurement window.

In this embodiment of this application, the first request information is transmitted in one or more of the following manners:
uplink control information;
radio resource control signaling;
media access control control element;
long-term evolution positioning protocol; and
new radio positioning protocol A.

In this embodiment of this application, information about the first measurement gap includes one or more of the following:
configuration information of the first measurement gap; and
a priority of the first measurement gap.

In this embodiment of this application, the apparatus further includes:
a third receiving module, configured to receive a terminal capability.

The terminal capability includes one or more of the following:
whether the first positioning measurement window is supported;
whether the first positioning measurement window and the first measurement gap are supported simultaneously;
whether PRS measurement within the first positioning measurement window is supported;
a window length of the first positioning measurement window;
a periodicity of the first positioning measurement window;
the maximum number of TRPs supported within the first positioning measurement window;
the maximum number of resources supported within the first positioning measurement window;
the maximum number of resource sets supported within the first positioning measurement window;
a measurement capability within the first positioning measurement window;
an interval for switching between PRS beams within the first positioning measurement window; and
maximum measurement duration supported within the first positioning measurement window.

In this embodiment of this application, the apparatus further includes:
a second configuration module, configured to configure first PRS configuration information and/or second PRS configuration information based on configuration information of the first positioning measurement window.

In this embodiment of this application, the first PRS configuration information is configuration information of periodic PRS.

In this embodiment of this application, the second PRS configuration information includes one or more of the following:
configuration information of periodic PRS;
configuration information of a PRS relative to the first positioning measurement window;

configuration information of semi-persistent PRS; and
configuration information of aperiodic PRS.

In this embodiment of this application, the apparatus further includes a sending module for sending, by the network-side device to a neighboring cell, one or more of the following:
the configuration information of the first positioning measurement window;
the first positioning reference signal configuration information; and
the second positioning reference signal configuration information.

In this embodiment of this application, the first positioning reference signal configuration information, the second positioning reference signal configuration information, and/or the configuration information of the first positioning measurement window includes one or more of the following: frame offset information; and
absolute time information.

In this embodiment of this application, a sequence generation rule for the positioning reference signal includes one or more of the following:
a time-domain position relative to each cell;
a time-domain position relative to the first positioning measurement window; and
a time-domain position relative to a serving cell or a reference cell.

The apparatus provided in this embodiment of this application is capable of implementing the processes implemented in the method embodiment shown in FIG. 4, with the same technical effects achieved. To avoid repetition, details are not described herein again.

Figure 8:
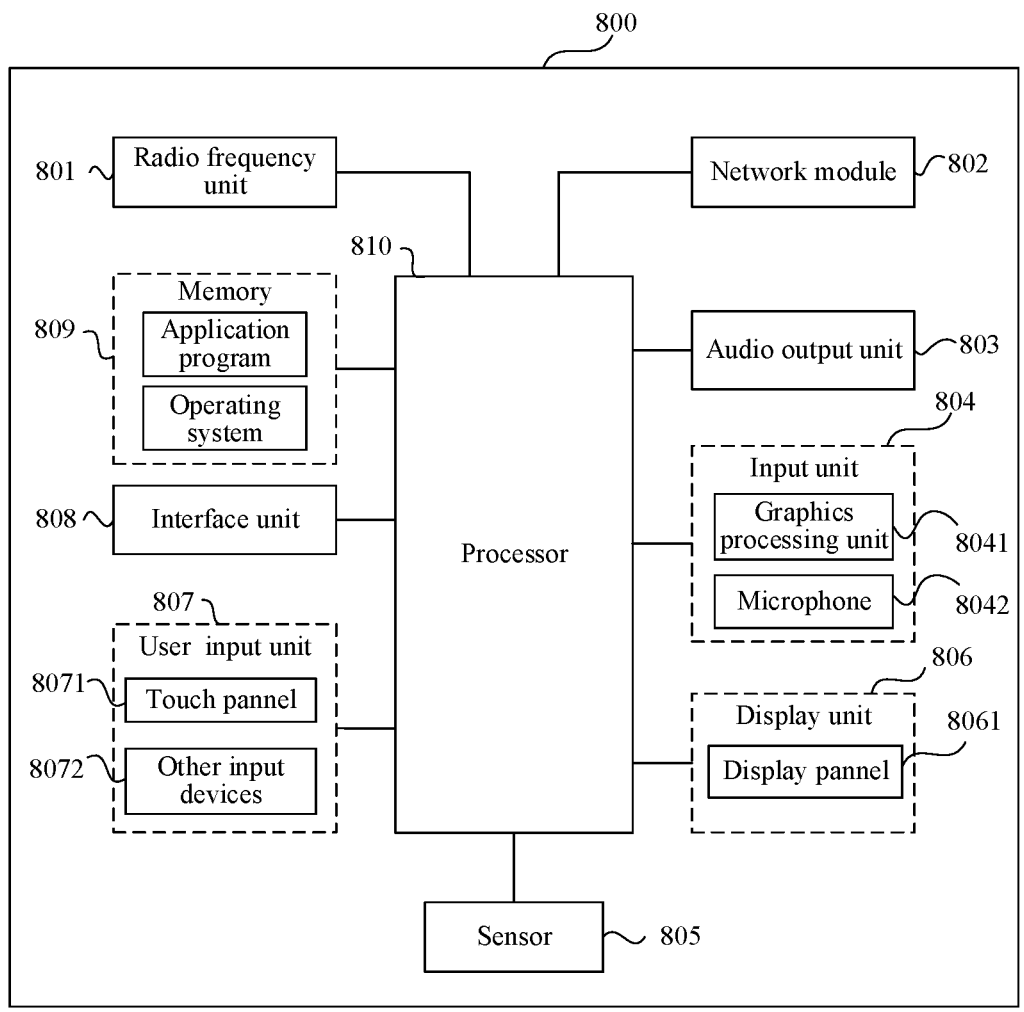
FIG. 8 is a schematic diagram of a terminal according to an embodiment of this application.

FIG. 8 is a schematic structural diagram of hardware of a terminal for implementing the embodiments of this application. The terminal 800 includes but is not limited to components such as a radio frequency unit 801, a network module 802, an audio output unit 803, an input unit 804, a sensor 805, a display unit 806, a user input unit 807, an interface unit 808, a memory 809, and a processor 810.

Persons skilled in the art can understand that the terminal 800 may further include a power supply (for example, a battery) supplying power to the components, and the power supply may be logically connected to the processor 810 through a power management system. In this way, functions such as charge management, discharge management, and power consumption management are implemented by using the power management system. The structure of the terminal shown in FIG. 8 does not constitute any limitation on the terminal. The terminal may include more or fewer components than those shown in the figure, or a combination of some components, or the components disposed differently. Details are not described herein again.

It can be understood that in this embodiment of this application, the input unit 804 may include a graphics processing unit (GPU) 8041 and a microphone 8042. The graphics processing unit 8041 processes image data of a still picture or video obtained by an image capture apparatus (such as a camera) in a video capture mode or an image capture mode. The display unit 806 may include a display panel 8061, and the display panel 8061 may be configured in a form of a liquid crystal display, an organic light-emitting diode, and the like. The user input unit 807 may include a touch panel 8071 and other input devices 8072. The touch panel 8071 is also referred to as a touchscreen. The touch panel 8071 may include two parts: a touch detection apparatus and a touch controller. The other input devices 8072 may include but are not limited to a physical keyboard, a function key (such as a volume control key or a power on/off key), a trackball, a mouse, a joystick, and the like. Details are not described herein.

In this embodiment of this application, the radio frequency unit 801 receives downlink data from a network-side device, and then sends the downlink data to the processor 810 for processing; and also sends uplink data to the network-side device. Generally, the radio frequency unit 801 includes but is not limited to an antenna, at least one amplifier, a transceiver, a coupler, a low noise amplifier, a duplexer, and the like.

The memory 809 may be configured to store software programs or instructions and various data. The memory 809 may include a program or instruction storage area and a data storage area. The program or instruction storage area may store an operating system, an application program or instruction required by at least one function (for example, a sound playback function or an image playback function), and the like. In addition, the memory 809 may include a high-speed random access memory, and may further include a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory, for example, at least one disk storage device, a flash memory device, or another volatile solid-state storage device.

The processor 810 may include one or more processing units. Optionally, an application processor and a modem processor may be integrated in the processor 810. The application processor primarily processes an operating system, user interfaces, application programs or instructions, and the like. The modem processor primarily processes radio communication, for example, being a baseband processor. It can be understood that the modem processor may alternatively be not integrated in the processor 810.

The terminal provided in this embodiment of this application is capable of implementing the processes implemented in the method embodiment shown in FIG. 4, with the same technical effects achieved. To avoid repetition, details are not described herein again.

Figure 9:
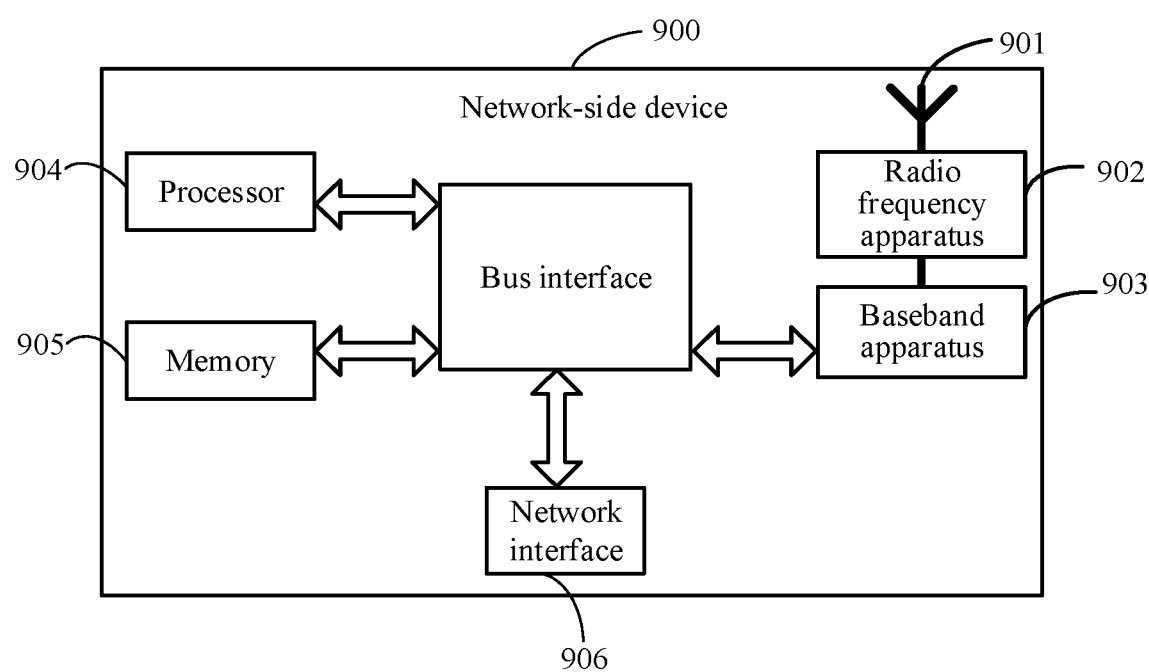
FIG. 9 is a schematic diagram of a network-side device according to an embodiment of this application.

Specifically, an embodiment of this application further provides a network-side device. As shown in FIG. 9, the network-side device 900 includes an antenna 901, a radio frequency apparatus 902, and a baseband apparatus 903. The antenna 901 is connected to the radio frequency apparatus 902. In an uplink direction, the radio frequency apparatus 902 receives information by using the antenna 901, and sends the received information to the baseband apparatus 903 for processing. In a downlink direction, the baseband apparatus 903 processes to-be-sent information, and sends the information to the radio frequency apparatus 902; and the radio frequency apparatus 902 processes the received information and then sends the information out by using the antenna 901.

The frequency band processing apparatus may be located in the baseband apparatus 903. The method performed by the network-side device in the foregoing embodiments may be implemented in the baseband apparatus 903, and the baseband apparatus 903 includes a processor 904 and a memory 905.

The baseband apparatus 903 may include, for example, at least one baseband board, where a plurality of chips are disposed on the baseband board. As shown in FIG. 9, one of the chips, for example, the processor 904, is connected to the memory 905, to invoke a program in the memory 905 to perform the operation of the network device shown in the foregoing method embodiments.

The baseband apparatus 903 may further include a network interface 906, configured to exchange information with the radio frequency apparatus 902, where the interface is, for example, a common public radio interface (CPRI).

Specifically, the network-side device in this embodiment of this application further includes: instructions or a program stored in the memory 905 and capable of running on the processor 904. The processor 904 invokes the instructions or program in the memory 905 to execute the method executed by the modules shown in FIG. 7, with the same technical effects achieved. To avoid repetition, details are not repeated herein.

An embodiment of this application further provides a program product, where the program product is stored in a non-transitory readable storage medium, and the program product is executed by at least one processor to implement the steps of the positioning measurement method shown in FIG. 4 or FIG. 5.

An embodiment of this application further provides a readable storage medium. The readable storage medium may be non-volatile or volatile. A program or instructions are stored in the readable storage medium. When the program or the instructions are executed by a processor, the processes of the foregoing embodiment of the method shown in FIG. 4 or FIG. 5 can be implemented, with the same technical effects achieved. To avoid repetition, details are not described herein again.

The processor is a processor in the terminal described in the foregoing embodiments. The readable storage medium includes a computer-readable storage medium, for example, a computer ROM, a random access memory (RAM), a magnetic disk, or an optical disc.

An embodiment of this application further provides a chip, where the chip includes a processor and a communications interface. The communications interface is coupled to the processor, and the processor is configured to run a program or instructions of a network device side to implement the processes of the foregoing method embodiments shown in FIG. 4 or FIG. 5, with the same technical effects achieved. To avoid repetition, details are not described herein again.

It should be understood that the chip mentioned in the embodiments of this application may also be referred to as a system-level chip, a system chip, a chip system, a system-on-chip, or the like.

An embodiment of this application further provides a computer program product, where the computer program product is stored in a non-transitory readable storage medium, and when being executed by at least one processor, the computer program product is configured to implement the processes of the foregoing method embodiments shown in FIG. 4 or FIG. 5, with the same technical effects achieved. To avoid repetition, details are not repeated herein.

It should be noted that the terms "include", "comprise", or any of their variants are intended to cover a non-exclusive inclusion, such that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element. In addition, it should be noted that the scope of the method and the apparatus in the embodiments of this application is not limited to executing the functions in an order shown or discussed, but may also include executing the functions in a substantially simultaneous manner or in a reverse order, depending on the functions involved. For example, the described methods may be performed in an order different from that described, and steps may alternatively be added, omitted, or combined. In addition, features described with reference to some examples may be combined in other examples.

According to the foregoing description of the implementations, a person skilled in the art may clearly understand that the methods in the foregoing embodiments may be implemented by using software in combination with a necessary common hardware platform, and certainly may alternatively be implemented by using hardware. However, in most cases, the former is a preferred implementation. Based on such an understanding, the technical solutions of the present invention essentially or the part contributing to the prior art may be implemented in a form of a software product. The software product is stored in a storage medium (such as a ROM/RAM, a magnetic disk, or an optical disc), and includes several instructions for instructing a terminal (which may be a mobile phone, a computer, a server, an air conditioner, a network device, or the like) to perform the methods described in the embodiments of this disclosure.

The foregoing describes the embodiments of this application with reference to the accompanying drawings. However, this application is not limited to the foregoing specific embodiments. The foregoing specific embodiments are merely illustrative rather than restrictive. As instructed by this application, persons of ordinary skill in the art may develop many other manners without departing from principles of this application and the protection scope of the claims, and all such manners fall within the protection scope of this application.

The invention claimed is:

1. A positioning measurement method, comprising:
performing, by a terminal, measurement on a plurality of positioning reference signals within a first positioning measurement window; and
determining, by the terminal, location information of the terminal based on measurement results of the plurality of positioning reference signals;
wherein the first positioning measurement window is determined based on one or more of the following:
configuration information of the first positioning measurement window;
first request information, wherein the first request information is used to request for the first positioning measurement window; and
wherein the configuration information of the first positioning measurement window comprises:
identification information of the first positioning measurement window;
time domain information of the first positioning measurement window; and
a priority of the first positioning measurement window.

2. The method according to claim 1, wherein the first positioning measurement window is determined further based on a plurality of first positioning search windows;
wherein the plurality of first positioning search windows have at least one of the following characteristics:
each of a plurality of TRPs is configured with a same or different first positioning search windows;
the number of first positioning search windows of the plurality of TRPs is the number of TRP groups; and the plurality of first positioning search windows comprise one or more maximum search ranges, wherein the maximum search range limits a range of the first positioning search window.

3. The method according to claim 1, wherein the configuration information of the first positioning measurement window further comprises one or more of the following:
identification information of the first positioning measurement window;
time domain information of the first positioning measurement window;
frequency domain information of the first positioning measurement window;
a priority of the first positioning measurement window;
positioning reference signal configuration information of one or more TRPs relative to the first positioning measurement window; or
first positioning search window information of a plurality of TRPs relative to the first positioning measurement window.

4. The method according to claim 3, wherein the frequency domain information of the first positioning measurement window comprises one or more of the following:
a frequency domain starting point of the first positioning measurement window;
bandwidth information of the first positioning measurement window;
a frequency domain granularity of the first positioning measurement window;
a subcarrier spacing of the first positioning measurement window; and
a frequency domain offset of the first positioning measurement window.

5. The method according to claim 4, wherein a frequency domain starting point of the first positioning measurement window is a starting point of an active BWP.

6. The method according to claim 3, wherein in a case that the first positioning measurement window has been configured for the terminal, the terminal needs to perform radio resource management (RRM) measurement, and the RRM measurement needs to be performed in a measurement gap, requesting, by the terminal, for configuration of a second measurement gap.

7. The method according to claim 1, wherein the method further comprises: receiving the configuration information of the first positioning measurement window.

8. The method according to claim 1, wherein the time domain information of the first positioning measurement window comprises one or more of the following:
a start time of the first positioning measurement window;
a window length of the first positioning measurement window;
a time domain type of the first positioning measurement window;
a repetition parameter of the first positioning measurement window; and
a time interval between repeated first positioning measurement windows.

9. The method according to claim 1, wherein the first request information comprises:
measurement configuration information of one or more positioning reference signals.

10. The method according to claim 1, wherein the method further comprises:
transmitting the first request information in a first transmission manner; wherein the first transmission manner comprises one or more of the following:
uplink control information;
radio resource control signaling;
media access control control element;
long-term evolution positioning protocol; and
new radio positioning protocol A.

11. The method according to claim 1, wherein the first positioning measurement window is determined further based on a first measurement gap;
wherein information about the first measurement gap comprises one or more of the following:
identification information of the first measurement gap;
configuration information of the first measurement gap; and
a priority of the first measurement gap.

12. The method according to claim 1, wherein the performing, by a terminal, measurement on a plurality of positioning reference signals within a first positioning measurement window comprises:
in response to a first event, performing, by the terminal, measurement on the plurality of positioning reference signals within the first positioning measurement window,
wherein the first event comprises one or more of the following:
a positioning response latency is less than a first threshold;
a positioning service latency indicator is less than a second threshold;
the positioning service is a specific positioning service;
a first measurement gap is unable to satisfy a requirement;
request for the first measurement gap fails;
one or more positioning reference signals are sent in an active bandwidth part BWP;
one or more positioning reference signals are sent in a specific frequency domain range; and
configuration of the first measurement gap fails.

13. The method according to claim 1, wherein the method further comprises:
in response to a second event, receiving, by the terminal, the configuration information of the first positioning measurement window or sending, by the terminal, first request information,
wherein the second event comprises one or more of the following:
a positioning response latency is less than a first threshold;
a positioning service latency indicator is less than a second threshold;
the positioning service is a specific positioning service;
a first measurement gap is unable to satisfy a requirement;
request for the first measurement gap fails;
one or more positioning reference signals are sent in an active bandwidth part BWP;
one or more positioning reference signals are sent in a specific frequency domain range; and
configuration of the first measurement gap fails.

14. The method according to claim 1, wherein the first positioning measurement window and a first measurement gap used for positioning reference signal measurement are not simultaneously configured for the terminal.

15. The method according to claim 1, wherein if the first positioning measurement window has been configured for the terminal, the terminal does not request for a first measurement gap used for positioning reference signal measurement or the first measurement gap is not configured.

16. The method according to claim 1, wherein if a second measurement gap and the first positioning measurement window have been configured for the terminal,
- the first positioning measurement window is disabled after configuration of the second measurement gap;

or
- based on priorities of the second measurement gap and the first positioning measurement window, determining that the second measurement gap or the first positioning measurement window is disabled;

or
- the terminal does not expect to perform positioning reference signal measurement during configuration of the second measurement gap;

or
- within the second measurement gap, the terminal does not expect to perform positioning reference signal measurement, or the first positioning measurement window is disabled;

or
- performing, by the terminal, positioning reference signal measurement beyond the second measurement gap and within the first positioning measurement window;

or
- performing, by the terminal, RRM measurement within the second measurement gap;

or
- performing, by the terminal, positioning reference signal measurement and RRM measurement within the second measurement gap.

17. The method according to claim 1, wherein the method further comprises:
- reporting a terminal capability to a network-side device; wherein
- the terminal capability comprises one or more of the following:
  - whether the first positioning measurement window is supported;
  - whether the first positioning measurement window and the first measurement gap are supported simultaneously;
  - whether positioning reference signal measurement within the first positioning measurement window is supported;
  - a window length of the first positioning measurement window;
  - a periodicity of the first positioning measurement window;
  - the maximum number of TRPs supported within the first positioning measurement window;
  - the maximum number of resources supported within the first positioning measurement window;
  - the maximum number of resource sets supported within the first positioning measurement window;
  - a measurement capability within the first positioning measurement window;
  - an interval for switching between positioning reference signal beams within the first positioning measurement window; and
  - maximum measurement duration supported within the first positioning measurement window.

18. A terminal, comprising a processor, a memory, and a program stored in the memory and capable of running on the processor, wherein when the program is executed by the processor, the processor is configured to:
- perform measurement on a plurality of positioning reference signals within a first positioning measurement window; and
- determine location information of the terminal based on measurement results of the plurality of positioning reference signals;
- wherein the first positioning measurement window is determined based on one or more of the following:
  - configuration information of the first positioning measurement window;
  - first request information, wherein the first request information is used to request for the first positioning measurement window; and
- wherein the configuration information of the first positioning measurement window comprises:
  - identification information of the first positioning measurement window;
  - time domain information of the first positioning measurement window; and
  - a priority of the first positioning measurement window.

19. A network-side device, comprising a processor, a memory, and a program stored in the memory and capable of running on the processor, wherein when the program is executed by the processor, the processor is configured to configure a first positioning measurement window, wherein the first positioning measurement window is used for performing measurement on a plurality of positioning reference signals by a terminal;
- wherein the first positioning measurement window is determined based on one or more of the following:
  - configuration information of the first positioning measurement window;
  - first request information, wherein the first request information is used to request for the first positioning measurement window; and
- wherein the configuration information of the first positioning measurement window comprises:
  - identification information of the first positioning measurement window;
  - time domain information of the first positioning measurement window; and
  - a priority of the first positioning measurement window.

* * * * *